United States Patent [19]

Escano et al.

[11] Patent Number: 5,665,151
[45] Date of Patent: Sep. 9, 1997

[54] METHOD FOR MAKING ARTICLE WITH AND DETECTING WATER BASED INKS CONTAINING NEAR INFRARED FLUOROPHORES

[75] Inventors: Nelson Zamora Escano; James John Krutak, Sr., both of Kingsport, Tenn.

[73] Assignee: Eastman Chemical Company, Kingsport, Tenn.

[21] Appl. No.: 751,629

[22] Filed: Nov. 18, 1996

Related U.S. Application Data

[62] Division of Ser. No. 546,973, Oct. 23, 1995, Pat. No. 5,614,008.

[51] Int. Cl.$^6$ .................. C09D 11/00; C08G 69/00; C08L 67/02
[52] U.S. Cl. .................. 106/31.15; 528/275; 528/281; 528/282; 528/283; 528/288; 528/289; 528/290; 528/291; 528/292; 528/295; 528/298; 528/302; 528/303; 528/308; 524/602; 524/603; 524/604; 524/606; 524/608; 428/395
[58] Field of Search ............ 528/275, 281, 528/282, 283, 288, 289, 290, 291, 292, 295, 298, 302, 303, 308; 524/602, 603, 604, 606, 608; 106/21 R, 21 A, 21 D, 22 R, 23 D; 428/395; 252/301.16

[56] References Cited

U.S. PATENT DOCUMENTS

| | | | |
|---|---|---|---|
| 3,546,008 | 12/1970 | Shields et al. | 428/395 |
| 3,630,941 | 12/1971 | Bergmark | 252/700 |
| 3,734,874 | 5/1973 | Kibler et al. | 524/603 |
| 3,779,993 | 12/1973 | Kibler et al. | 528/295 |
| 3,828,010 | 8/1974 | Davis et al. | 528/288 |
| 4,202,491 | 5/1980 | Suzuki | 235/491 |
| 4,233,196 | 11/1980 | Sublett | 524/602 |
| 4,435,220 | 3/1984 | Watanabe et al. | 106/415 |
| 4,540,595 | 9/1985 | Acitelli et al. | 427/7 |
| 5,093,147 | 3/1992 | Andrus et al. | 427/7 |
| 5,336,714 | 8/1994 | Krutak et al. | 524/608 |
| 5,397,819 | 3/1995 | Krutak et al. | 524/88 |

OTHER PUBLICATIONS

Japanese Laid-Open Patent Application: Hei3-79683.
Wheeler, et al., J.A.C.S., vol. 106, No. 24, 1984, pp 7404–7410.

*Primary Examiner*—Samuel A. Acquah
*Attorney, Agent, or Firm*—Karen A. Harding; Harry J. Gwinnell

[57] ABSTRACT

The present invention provides inks which contain a near infrared fluorophoric compound incorporated into a water-dissipatible polyester backbone. The inks of the present invention are preferably colorless or "invisible" but could be made slightly colored if desirable. Specifically, the inks of the present invention comprise:

- A. between about 1 and 10 weight percent of at least one water-dissipatable polyester having from about 0.1 ppm by weight to about 10% by weight of a thermally stable near infrared fluorophoric compound copolymerized therein;
- B. between about 5 and 75 weight percent of at least one aliphatic humectant;
- C. between about 0 and 15 weight percent of at least one lower aliphatic alcohol of no more than 3 carbon atoms;
- D. water and optionally up to about 2 weight percent of one or more additives;

wherein the weight percentages of components A–D equal 100%.

21 Claims, No Drawings

METHOD FOR MAKING ARTICLE WITH AND DETECTING WATER BASED INKS CONTAINING NEAR INFRARED FLUOROPHORES

This is a divisional application of application Ser. No. 08/546,973, filed Oct. 23, 1995 U.S. Pat. No. 5,614,008.

FIELD OF THE INVENTION

This invention relates to aqueous ink formulations suitable for ink jet printing, both by drop-on-demand (DOD) and continuous printing methods, and which contain sulfopolyesters/amides having near infrared fluorophores copolymerized therein.

BACKGROUND OF THE INVENTION

It is desirable to provide intelligible markings that are virtually invisible to the human eye on the surface of articles for identification, authentication, sorting, etc. U.S. Pat. Nos. 5,093,147; 5,336,714 disclose using certain near infrared fluorescent compounds having minimal light absorption of radiation in the visible range 400–700 nanometers (nm) and strong light absorption in the near infrared region about 700–900 nm with accompanying fluorescence to produce fluorescent radiation of wavelengths longer than the wavelength of excitation. However, aqueous ink formulations suitable for ink jet printing are not disclosed and markings produced from those compounds do not have adequate stability to sunlight/ultraviolet (UV) light to permit practical marking speeds required for suitable intelligible markings.

The polymeric compositions used in U.S. Pat. No. 5,336,714 are unique in that the near infrared fluorophores (NIRF's) are copolymerized therein and thus are not extractable, exudable, sublimable or leachable from the polymeric composition. The phthalocyanines and naphthalocyanines mentioned therein are unique in that they provide improved UV light stability over the known cyanine laser dyes used in U.S. Pat. No. 5,093,147. However, U.S. Pat. No. 5,336,714 provides no help in formulating an aqueous based ink suitable for ink jet printing using the polymeric compositions containing the copolymerized NIRF compound.

U.S. Pat. No. 4,540,595 provides an ink which fluoresces in the near infrared and which is used to mark documents such as bank checks for automatic identification. The dyes used are phenoxazines (e.g. 3,7-bis(diethylamino) phenoxazonium nitrate is the preferred fluorescent material) which impart blue color to the marked substrate and thus are not invisible.

Certain inorganic rare earth compounds typified by neodymium (Nd), erbium (Er) and ytterbium (Yb) have been used to impart fluorescent markings that can be activated in the infrared to data cards (U.S. Pat. No. 4,202,491). Inks prepared from the insoluble rare earth metals are prone to clogging ink jet nozzles causing poor print start-up and thus, in general, are not practical.

In U.S. Pat. No. 5,093,147 inks are disclosed which are useful for printing infrared fluorescent invisible markings on the surface of an article using certain known polymethine (cyanine) laser dyes. The dyes used, however, have the disadvantage of fading or decomposing upon brief exposure times to ultraviolet light, thus rendering the marking method inferior.

Certain 16,17-dialkoxyviolanthrones (also called dibenzanthrones) are known (U.S. Pat. No. 3,630,941) to be useful as infrared fluorescent markers when solubilized in various substrates, although they are not fluorescent in the solid state. These high molecular weight compounds have essentially no water solubility and thus have no utility for formulation of water based inks for ink jet printing. Furthermore, these compounds have significant absorption of light having wavelengths below 700 nanometers and therefore do not usually provide invisible markings.

Japanese Laid-Open Patent Application: Hei3-79683 discloses ink formulations containing infrared absorbing naphthalocyanine compounds useful for printing barcodes and for identifying documents to prevent falsification and forgery. Various meltable waxes and thermoplastic resins are used as vehicles in combination with alcohols and aromatic hydrocarbons to produce non-aqueous inks. The high molecular weight naphthalocyanine compounds have essentially no water solubility and are not useful for formulating aqueous inks for ink jet printing directly. The marking method mentioned in this application does not utilize fluorescence of the naphthalocyanines when exposed to infrared radiation, but relies merely on absorption of infrared radiation.

U.S. Pat. No. 5,336,714 discloses aqueous coating compositions containing about 20 weight percent to about 35 weight percent of a water-dissipatable sulfopolyester having 0.1 ppm by weight to about 10% by weight of a thermally stable near infrared fluorophoric compound copolymerized therein dispersed in water (65–80 weight percent). The ink formulation disclosed (Example 7) was suitable for coating substrates such as paper with drawdown rods, but is not suitable for ink jet printing because of plugging or clogging of the jets.

DESCRIPTION OF THE INVENTION

This invention relates to an aqueous ink composition suitable for use in ink jet printing comprising:

A. between about 1 and 10 weight percent of at least one water-dissipatable polyester comprising:
  (i) monomer residues of at least one dicarboxylic acid;
  (ii) about 4 to 25 mole percent, based on the total of all acid, hydroxy and amino equivalents, of monomer residues of at least one difunctional sulfomonomer containing at least one sulfonate group bonded to an aromatic ring where the functional groups are hydroxy, carboxyl, carboxylate ester or amino;
  (iii) monomer residues of at least one diol or a mixture of diol and a diamine; and optionally,
  (iv) monomer residues of at least one difunctional monomer reactant selected from hydroxycarboxylic acids, amino carboxylic acids and aminoalkanols;
provided that at least 20 percent of the groups linking the monomeric units are ester linkages; said water-dissipatable polyester having from about 0.1 ppm by weight to about 10% by weight of a thermally stable near infrared fluorophoric compound copolymerized therein;

B. between about 5 and 75 weight percent of at least one binder;
C. between about 0 and 15 weight percent of at least one lower aliphatic alcohol of no more than 3 carbon atoms;
D. water and optionally up to about 2 weight percent of one or more additives;
wherein the weight percentages are based on the total weights of components A–D.

In a preferred embodiment, component A is a water-dissipatable sulfopolyester and component (iii) comprises (a) at least 15 mole percent, based on the total mole percent of diol monomer residues, of a diol having the formula $H(OCH_2CH_2)_nOH$, where n is 2 to about 20, or (b) about 0.1 to less than about 15 mole percent, based on the total mole percent of diol monomer residues or diol and diamine residues of a poly(ethylene glycol) having the formula $H(OCH_2CH_2)_nOH$, where n is 2 to about 500, provided that the mole percent of such residues is inversely proportional to the value of n.

The water dissipatable polyesters are any polyesters which are capable of forming electrostatically stabilized colloids having particle sizes between about 200 and 800 Å in diameter. Preferably the polyesters are water-dissipatable sulfopolyesters/amides used which are described in U.S. Pat. No. 5,336,714.

The compositions of the present invention may be used for a wide variety of printer applications which can utilize water based inks.

For example, an ink composition useful for drop-on-demand (DOD) ink jet printing via the piezoelectric impulse method comprises:
- A. between about 1 and 10 weight percent of said at least one water-dissipatable polyester having from about 0.1 ppm by weight to about 10% by weight of a thermally stable near infrared fluorophoric compound copolymerized therein;
- B. between about 45 and 75 weight percent of said at least one binder or humectant;
- C. between about 2 and about 15 weight percent of at least one lower alcohol;
- D. between about 0.01 and about 0.50 weight percent of at least one corrosion inhibitor;
- E. between about 0.01 and about 0.30 weight percent of at least one biocide;
- F. water, wherein the weight percentages are based on the total weights of components A–F.

Another preferred ink composition particularly useful for drop-on-demand (DOD) jet printing via the so-called bubble jet method comprises:
- A. between about 1 and about 10 weight percent of said at least one water-dissipatable polyester having from about 0.1 ppm by weight to about 10% by weight of a thermally stable near infrared fluorophoric compound copolymerized therein;
- B. between about 20 and about 60 weight percent of at least one humectant;
- C. between about 0.50 and about 1.5 weight percent of at least one surface active agent;
- D. between about 0.01 and about 0.5 weight percent of at least one corrosion inhibitor;
- E. between about 0.01 and about 0.3 weight percent of at least one biocide;
- F. water, wherein the weight percentages are based on the total weights of components A–F.

A preferred ink composition particularly useful for continuous ink jet printing using the Scitex ink-jet imaging system (Scitex Digital Printing, Inc., Dayton, Ohio 45420-4099) comprises:
- A. between about 1 and about 10 weight percent of said at least one water-dissipatable polyester having from about 0.1 ppm by weight to about 10% by weight of a thermally stable near infrared fluorophoric compound copolymerized therein;
- B. between about 4 and about 8 weight percent of said at least one humectant;
- C. between about 0.35 and about 0.65 weight percent of at least one surface active agents;
- D. between about 0.75 and about 1.25 weight percent of at least one defoaming agent;
- E. between about 0.01 and about 0.50 weight percent of at least one corrosion inhibitor;
- F. between about 0.01 and about 0.3 weight percent of at least one biocide;
- G. water, wherein weight percentages of A through G equal 100%.

Finally, a preferred ink composition for single nozzle continuous ink jet printers such as the Codebox 2, supplied by Amjet, Domino Amjet, Inc., Gurnee, Ill. 60031, comprises:
- A. between about 1 and about 10 weight percent of at least one water-dissipatable polyester having from about 0.1 ppm by weight to about 10% by weight of a thermally stable near infrared fluorophoric compound copolymerized therein;
- B. between about 30 and about 50 weight percent of at least one humectant;
- C. between about 5 and about 15 weight percent of said at least one lower aliphatic alcohol;
- D. between about 0.01 and about 0.50 weight percent of at least one corrosion inhibitor;
- E. between about 0.01 and about 0.30 weight percent of at least one biocide;
- F. water, wherein the percentages of A through F equal 100%.

The polyesters of component A are preferably sulfopolyester and or sulfopolyesteramides. The water-dissipatable polymers, without the near infrared fluorescent compounds incorporated therein, are described in U.S. Pat. Nos. 3,734,874; 3,779,993; 3,828,010; 3,546,008; 4,233,196; and 4,435,220.

The preferred near infrared fluorescent compounds useful in the practice of the invention are selected from the classes of phthalocyanines, naphthalocyanines and squaraines (derivatives of squaric acid) and correspond to Formulae II, III and IV:

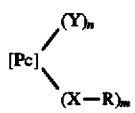

(II)

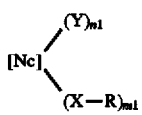

(III)

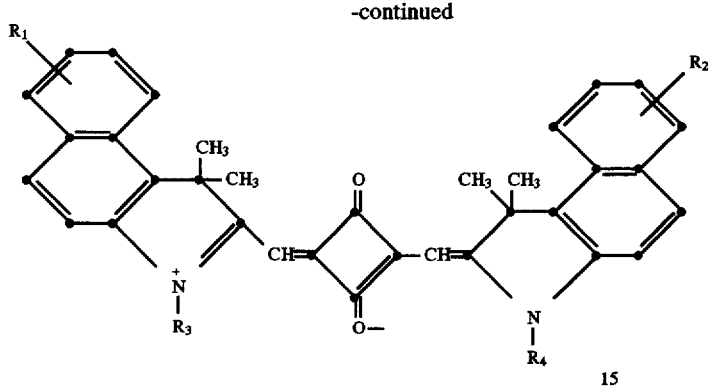
IV wherein Pc and Nc represent the phthalocyanine and naphthalocyanine moieties of Formulae IIa and IIIa, Phthalocyanine

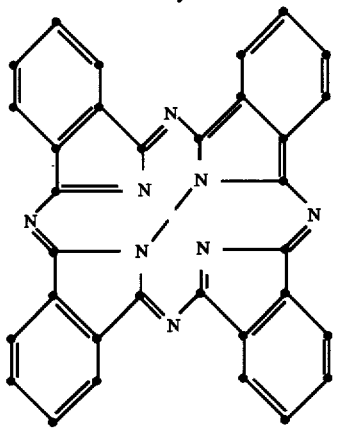

IIa 2,3-Naphthalocyanine

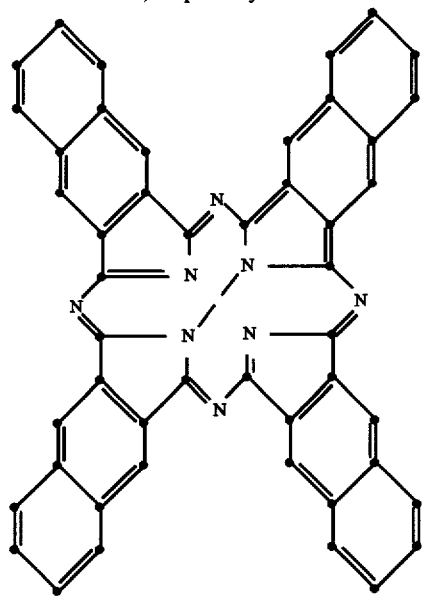

IIIa respectively, covalently bonded to hydrogen or to various metals, halometals, organometallic groups, and oxymetals including AlCl, AlBr, AlF, AlOH, AlOR$_5$, AlSR$_5$, Fe, Ge(OR$_6$)$_2$, GaCl, GaBr, GaF, GaOR$_5$, GaSR$_6$, Pb, InCl, Mg, Mn, SiCl$_2$, SiF$_2$, SnCl$_2$, Sn(OR$_6$)$_2$, Si(OR$_6$)$_2$, Sn(SR$_6$)$_2$, Si(SR$_6$)$_2$ and Zn, wherein R$_5$ and R$_6$ are selected from hydrogen, alkyl, aryl, aroyl, heteroaryl, lower alkanoyl, trifluoroacetyl, groups of the formulae $$-\underset{\underset{R_9}{|}}{\overset{\overset{R_7}{|}}{Sn}}-R_8, \quad -\underset{\underset{OR_9}{|}}{\overset{\overset{OR_7}{|}}{Sn}}-OR_8, \quad -\underset{\underset{R_9}{|}}{\overset{\overset{R_7}{|}}{Si}}-R_8,$$

$$-\underset{\underset{OR_9}{|}}{\overset{\overset{OR_7}{|}}{Si}}-OR_8, \quad -\underset{\underset{R_9}{|}}{\overset{\overset{R_7}{|}}{Ge}}-R_8, \text{ or } -\underset{\underset{OR_9}{|}}{\overset{\overset{OR_7}{|}}{Ge}}-OR_8;$$

R$_7$, R$_8$ and R$_9$ are independently selected from alkyl, phenyl or phenyl substituted with lower alkyl, lower alkoxy or halogen;

X is selected from oxygen, sulfur, selenium, tellurium or a group of the formula N—R$_{10}$, wherein R$_{10}$ is hydrogen, cycloalkyl, alkyl, acyl, alkylsulfonyl, or aryl or R$_{10}$ and R taken together form an aliphatic or aromatic ring with the nitrogen atom to which they are attached;

Y is selected from alkyl, aryl, halogen or hydrogen;

R is selected from unsubstituted or substituted alkyl, alkenyl, alkynyl,

C$_3$–C$_8$ cycloalkyl, aryl, heteroaryl, alkylene

or alkylene

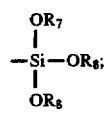

or

—(X—R)$_m$ is alkylsulfonylamino, arylsulfonylamino, or a group selected from the formulae —X(C$_2$H$_4$O)$_z$R$^1$,

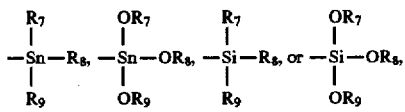

wherein R$^1$ is hydrogen or R as defined above; Z is an integer of from 1–4;

or two —(X—R)$_m$ groups can be taken together to form divalent substituents of the formula

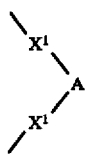

wherein each $X^1$ is independently selected from —O—, —S—, or —N—R$_{10}$ and A is selected from ethylene; propylene; trimethylene; and such groups substituted with $C_1$-$C_4$ alkyl, $C_1$-$C_4$ alkoxy, aryl and cycloalkyl; 1,2-phenylene and 1,2-phenylene containing 1-3 substituents selected from $C_1$-$C_4$ alkyl, $C_1$-$C_4$ alkoxy or halogen;

R$_1$ and R$_2$ are independently selected from hydrogen, lower alkyl, lower alkoxy, halogen, aryloxy, lower alkylthio, arylthio, lower alkylsulfonyl; arylsulfonyl; lower alkylsulfonylamino, arylsulfonylamino, cycloalkylsulfonylamino, carboxy, unsubstituted and substituted carbamoyl and sulfamoyl, lower alkoxycarbonyl, hydroxy, lower alkanoyloxy,

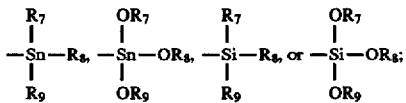

R$_3$ and R$_4$ are independently selected from hydrogen, lower alkyl, alkenyl or aryl; n is an integer from 0–12; n$_1$ is an integer from 0–24, m is an integer from 4–16; m$_1$ is an integer from 0–16, provided that the sums of n+m and n$_1$+m$_1$ are 16 and 24, respectively.

In a preferred embodiment of this aspect of the present invention m is from 4 to 12; m$_1$ is from 0–8; provided that in the definitions of the substituents (Y)n, (Y)n$_1$ and (—X—R)m$_1$ that these substituents are not present when n, n$_1$ and m$_1$ are zero, respectively. Substituents (X—R)m and (Y)n are present in compounds IIa on the peripheral carbon atoms, i.e. in positions 1, 2, 3, 4, 8, 9, 10, 11, 15, 16, 17, 18, 22, 23, 24, 25 and substituents (X—R)m$_1$ and (Y)n$_1$ are present on the peripheral carbon atoms of III, i.e. in positions 1, 2, 3, 4, 5, 9, 10, 11, 12, 13, 14, 18, 19, 20, 21, 22, 23, 27, 28, 29, 30, 31, 32 and 36.

Preferably the near infrared fluorescing compound is covalently bonded to a moeity selected from the groups consisting of AlCl, AlBr, AlF, AlOH, AlOR$_5$, AlSR$_5$, Ge(OR$_6$)$_2$, GaCl, GaBr, GaF, GaOR$_5$, GaSR$_6$, Mg, SiCl$_2$, SiF$_2$, SnCl$_2$, Sn(OR$_6$)$_2$, Si(OR$_6$)$_2$, Sn(SR$_6$)$_2$, Si(SR$_6$)$_2$, and Zn.

Phthalocyanines and naphthalocyanines are the preferred near infrared fluorophores, particularly where stability to UV light or sunlight is desirable.

In the above definitions, the term alkyl is used to designate a straight or branched chained hydrocarbon radical containing 1–12 carbons.

In the terms lower alkyl, lower alkoxy, lower alkylthio, lower alkoxycarbonyl, lower alkanoyl and lower alkanoyloxy the alkyl portion of the groups contains 1–6 carbons and may be a straight or branched chain.

The term "cycloalkyl" is used to represent a cyclic aliphatic hydrocarbon radical containing 3–8 carbons, preferably 5 to 7 carbons.

The alkyl and lower alkyl portions of the previously defined groups may contain as further substituents one or more groups selected from hydroxy, halogen, carboxy, cyano, $C_1$-$C_4$-alkoxy, aryl, $C_1$-$C_4$-alkylthio, arylthio, aryloxy, $C_1$-$C_4$-alkoxycarbonyl or $C_1$-$C_4$-alkanoyloxy.

The term "aryl" includes carbocyclic aromatic radicals containing 6–18 carbons, preferably phenyl and naphthyl, and such radicals substituted with one or more substituents selected from lower alkyl, lower alkoxy, halogen, lower alkylthio, N(lower alkyl)$_2$, trifluromethyl, carboxy, lower alkoxycarbonyl, hydroxy, lower alkanoylamino, lower alkylsulfonylamino, arylsulfonylamino, cycloalkylsulfonylamino, lower alkanoyloxy, cyano, phenyl, phenylthio and phenoxy.

The term "heteroaryl" is used to represent mono or bicyclic hetero aromatic radicals containing at least one "hetero" atom selected from oxygen, sulfur and nitrogen or a combination of these atoms. Examples of suitable heteroaryl groups include: thiazolyl, benzothiazolyl, pyrazolyl, pyrrolyl, thienyl, furyl, thiadiazolyl, oxadiazolyl, benzoxazolyl, benzimidazolyl, pyridyl, pyrimidinyl and triazolyl. These heteroaryl radicals may contain the same substituents listed above as possible substituents for the aryl radicals. The term triazolyl also includes structure V and mixed isomers thereof.

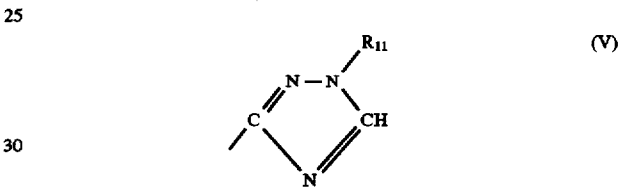

wherein R$_{11}$ is hydrogen or selected from lower alkyl and lower alkyl substituted with one or two groups selected from hydroxy, halogen, carboxy, lower alkoxy, aryl, cyano, cycloalkyl, lower alkanoyloxy or lower alkoxycarbonyl.

The terms "alkenyl and alkynyl" are used to denote aliphatic hydrocarbon moiety having 3–8 carbons and containing at least one carbon-carbon double bond and one carbon-carbon triple bond, respectively.

The term halogen is used to include bromine, chlorine, fluorine and iodine.

The term "substituted alkyl" is used to denote a straight or branched chain hydrocarbon radical containing 1–12 carbon atoms and containing as substituents 1 or 2 groups selected from hydroxy, halogen, carboxy, cyano, $C_1$-$C_4$ alkoxy, aryl, $C_1$-$C_4$ alkylthio, arylthio, aryloxy, $C_1$-$C_4$ alkoxycarbonyl, or $C_1$-$C_4$ alkanoyloxy.

The term "substituted carbamoyl" is used to denote a radical having the formula —CONR$_{12}$R$_{13}$, wherein R$_{12}$ and R$_{13}$ are selected from unsubstituted or substituted alkyl, alkenyl, alkynyl, cycloalkyl, aryl, or heteroaryl.

The term "substituted sulfamoyl" is used to denote a radical having the formula —SO$_2$NR$_{12}$R$_{13}$, wherein R$_{12}$ and R$_{13}$ are as defined above.

The term "alkylene" refers to a divalent $C_1$-$C_{12}$ aliphatic hydrocarbon moiety, either straight or branched-chain, and either unsubstituted or substituted with one or more groups selected from lower alkoxy, halogen, aryl, or aryloxy.

The term "acyl" refers to a group of the formula R°C(O)—O—, wherein R° is preferably a $C_1$-$C_{10}$ alkyl moiety. The term "alkyl sulfonyl" refers to a group of the formula R°SO$_2$—, wherein R° is as defined for acyl.

Preferred —X—R groups include those listed in Table I below.

TABLE 1

EXEMPLARY −X−R Groups

| −X−R | −X−R |
|---|---|
| −OCH$_3$ | −S−(benzothiazol-2-yl) |
| −OC$_4$H$_9$-n | −S−(pyridin-2-yl) |
| −OC(CH$_3$)$_3$ | −S−(5-methyl-1,3,4-thiadiazol-2-yl) |
| −OC$_{12}$H$_{25}$-n | −S−(1-(2-hydroxyethyl)-2-formyl-tetrazol-5-yl) |
| −SCH$_3$ | −S−(benzoxazol-2-yl) |
| −SC$_2$H$_4$OH | −S−(1H-benzimidazol-2-yl) |
| −SC$_8$H$_{17}$-n | −S−(5-methoxybenzothiazol-2-yl) |
| −OCH$_2$CH(C$_2$H$_5$)C$_4$H$_9$-n | −S−(5-methoxycarbonyl-1,3,4-oxadiazol-2-yl) |
| −OCH$_2$CH=CH$_2$ | −S−(4-methoxyphenyl) |
| −OCH$_2$CH=CH−CH$_3$ | −Te−(4-methoxyphenyl) |

TABLE 1-continued

EXEMPLARY −X−R Groups

| −X−R | −X−R |
|---|---|
| −SCH$_2$C$_6$H$_5$ | −Se−(phenyl) |
| −SCH$_2$CH(OH)CH$_2$OH | −OCH$_2$C$_6$H$_4$-4-COOH |
| −OCH$_2$C≡CH | −OC$_6$H$_4$-4-CH$_2$COOH |
| −N(C$_2$H$_5$)$_2$ | −OCH$_2$CH$_2$CO$_2$CH$_3$ |
| −NHC$_6$H$_5$ | −OCH$_2$CH$_2$OCOCH$_3$ |
| −N(CH$_3$)C$_6$H$_5$ | −O−C$_6$F$_5$ |
| −N(C$_2$H$_4$OH)$_2$ | −OC$_6$H$_4$-4-Cl |
| −NHC$_6$H$_{11}$ | −O−(naphthyl) |
| −N−(piperidinyl) | −O−(naphthyl) |
| −OC$_6$H$_5$ | −O(CH$_2$CH$_2$O)$_2$H |
| −OC$_6$H$_4$-4-COOH | −S(CH$_2$CH$_2$O)$_2$H |
| −SC$_6$H$_4$-4-COOH | −O(CH$_2$CH$_2$O)$_4$H |
| −OC$_6$H$_3$-3,5-diCOOH | −O(CH$_2$CH$_2$O)$_3$CH$_3$ |
| −OC$_6$H$_3$-3,5-diCO$_2$CH$_3$ | −O(CH$_2$CH$_2$O)$_2$C$_6$H$_5$ |
| −SC$_6$H$_4$-2-COOH | −NH(CH$_2$CH$_2$O)$_2$H |
| −SC$_6$H$_4$-3-CO$_2$CH$_3$ | |
| −OC$_6$H$_4$-4-C$_2$H$_4$OH | |
| −OC$_6$H$_4$-4-OC$_2$H$_4$OH | |

In the compounds above, it should be recognized that the structures must bear at least one polyester reactive group to allow the compound to be incorporated into the polymeric composition and to be bound by covalent bonds. The water-dissipatable polymers, without the near infrared fluorescent compounds incorporated therein, are described in U.S. Pat. Nos. 3,734,874; 3,779,993; 3,828,010; 3,546,008; 4,233,196; and 4,335,220, incorporated herein by reference.

The polymers of the present invention are, for the most part, water-dispersible because they form electrostatically-stabilized colloids when mixed with water. The colloid particle size varies with the polymer composition but has been shown by light diffraction studies and transmission electron microscopy (on fresh films) to be mostly 200–800 Å in diameter. The aqueous colloid dispersions exhibit a minimum precipitation of solid material with time, in the temperature range of 0.1°–99.9° C. because the relationship between the particle densities and viscosities (very similar to those of water when concentrations are less than 30 weight percent) are such that thermal energy expressed as Brownian motion is sufficient to keep the particles suspended in water.

The water-dispersible polyesters have an inherent viscosity of at least 0.1 dL/g, preferably about 0.28–0.38 dL/g, when determined at 25° C. using 0.25 g polymer per 100 ml of a solvent consisting of 60 parts by weight phenol and 40 parts by weight tetrachloroethane.

The sulfonate-containing, water-dispersible, linear polymers thus comprise polyesters, including polyester-amides, consisting of repeating, alternating residues of (1) one or more dicarboxylic acids and (2) one or more diols or a combination of one or more diols and one or more diamines where, in the preceding definition, the mole percentages are based on 100 mole percent dicarboxylic acid residues and 100 mole percent diol or diol and diamine residues. Alternatively, the polymers may include residues of monomers having mixed functionality such as hydroxycarboxylic acids, aminocarboxylic acids and/or aminoalkanols. The near infrared flourophoric (NIRF) compounds can thus be incorporated into the polyester, so long as the NIRF has one, or preferably two, polyester reactive groups (e.g., hydroxy, carboxy, etc.) present.

The residues of component (i) may be derived from one or more dicarboxylic acids or their ester-forming derivatives such as dialkyl esters, bis(hydroxyalkyl) esters, acid chlorides or, in some cases, anhydrides. The sulfonate group of component (ii) may be an alkali metal sulfonic salt such as lithium, potassium or, preferably, sodium sulfonate groups, or an ammonium or substituted ammonium sulfonate.

The preferred water-dispersible polymers have an inherent viscosity of about 0.28 to 0.38 dL/g and are comprised of:

(i) diacid monomer residues comprising about 75 to 84 mole percent isophthalic acid monomer residues and about 16 to 25 mole percent 5-sodiosulfoisophthalic acid monomer residues; and (ii) diol monomer residues comprising about 45 to 60 mole percent diethylene glycol monomer residues and about 40 to 55 mole percent ethylene glycol, 1,4-cyclohexanedimethanol monomer residues or mixtures thereof.

Specific embodiments of these water-dispersible polymers are available from Eastman Chemical Company, in the form of pellets (EASTMAN AQ 29S Polymer, EASTMAN 38S Polymer and EASTMAN 55S Polymer) and in the form of aqueous dispersions (EASTMAN AQ 29D Polymer, EASTMAN 38D Polymer and EASTMAN 55D Polymer). These polyesters have been shown to disperse in water due to the presence of 5-sodiosulfoisophthalic acid residues.

Preferably, the water dispersible polyester above contains some poly(ethylene glycol) to aid in its water dispersibility. When some poly(ethylene glycol) is used, the content of the sulfomonomer can be lower, which aids in flexibility of formulating the polyester.

The water dispersibility of the polyester is related to the weight percent of poly(ethylene glycol) and mole percent of sulfomonomer. Therefore, if the content of either is relatively low, the other should be relatively high to maintain adequate dispersibility.

The poly(ethylene glycol) need not be present in the initial reaction charge, because poly(ethylene glycol) may form in situ from decomposition products and be incorporated into the polyester chain. It is well known, for example, that diethylene glycol is formed in situ in such reactions.

In the preferred form of the present invention, the polyester contains repeating units of a poly(ethylene glycol) of the formula H—(OCH$_2$—CH$_2$)$_n$—OH wherein n is an integer of 2 to 500. The value of n is preferably from between about 2 to about 20. The values of n and the mole percent of poly(ethylene glycol) in the polyester, if used, are adjusted such that the mole percent of poly(ethylene glycol) within the stated range is inversely proportional to the quantity of n within the stated ranges. Thus, when the mole percent is high, the value of n is low. On the other hand, if the mole percent is low, the value of n is high. It is apparent, therefore, that the weight percent (product of mole percent and molecular weight) of the poly(ethylene glycol) is an important consideration because the water dissipatability of the copolyester decreases as the weight percent poly(ethylene glycol) in the copolyester decreases. For example, if the weight of poly(ethylene glycol) is too low, the water dissipatability of the copolyester may be inadequate. Furthermore, the weight percent of poly(ethylene glycol) is preferably adjusted such that it is inversely proportional to the mole percent of the difunctional sulfomonomer because the water dissipatability of the copolyester is a function of both the mole percent sulfomonomer and the weight percent polyethylene glycol.

Examples of suitable poly(ethylene glycols) include relatively high molecular weight polyethylene glycols, some of which are available commercially under the designation CARBOWAX, a product of Union Carbide. Diethylene glycol is also especially suitable.

Other useful glycols for preparing copolyesters include aliphatic, alicyclic and arylalkyl glycols. Examples of these glycols include ethylene glycol; propylene glycol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol, 1,4-butanediol, 1,5-pentanediol, 1,6-hexanediol, 2,2,4-trimethyl-1,6-hexanediol; thiodiethanol. 1,2-cyclohexanedimethanol, 1,3-cyclohexandimethanol; 1,4-cyclohexanedimethanol; 2,2,4,4-tetramethyl-1,3-cyclobutanediol; and p-xylylenediol.

The dicarboxylic acid component of the polyesters are preferably selected from aliphatic dicarboxylic acids, alicyclic dicarboxylic acids, aromatic dicarboxylic acids, or mixtures of two or more of these acids. Examples of such dicarboxylic acids, include succinic; glutaric; adipic; azelaic; sebacic; 1,4-cyclohexanedicarboxylic; phthalic; terephthalic and isophthalic acid. Terephthalic acid and isophthalic acid are preferred as the carboxylic acid component of the polyester.

It should be understood that use of the corresponding acid anhydrides, esters, and acid chlorides of these acids is included in the term "dicarboxylic acid."

The difunctional sulfomonomer component of the polyester may advantageously be a dicarboxylic acid or an ester thereof containing a metal sulfonate group, a glycol containing a metal sulfonate group or a hydroxy acid containing a metal sulfonate group. The metal ion of the sulfonate salt may be Na+, Li+, K+ and the like. When a monovalent alkali metal ion is used, the resulting polyesters are less readily dissipated by cold water and more readily dissipated by hot water. When a divalent or a trivalent metal ion is used the resulting polyesters are not ordinarily easily dissipated by cold water but are more readily dissipated in hot water. It is possible to prepare the polyester using, for example, a sodium sulfonate salt and latex and by ion-exchange replace this ion with a different ion, and thus alter the characteristics of the polymer. The difunctional monomer component may also be referred to the difunctional sulfomonomer and is further described herein below.

Advantageous difunctional sulfomonomer components are those wherein the sulfonate salt group is attached to an aromatic acid nucleus such as benzene, naphthalene, diphenyl, oxydiphenyl, sulfonyldiphenyl or methylenediphenyl nucleus. Preferred results are obtained through the use of sulfophthalic acid, sulfoterephthalic acid, sulfoisophthalic acid, 4-sulfonaphthalene-2,7-dicarboxylic acid, and their esters.

Particularly superior results are achieved when the difunctional sulfomonomer component is 5-sodiosulfoisophthalic acid or its esters, and the glycol is a mixture of ethylene glycol or 1,4-cyclohexanedimethanol with diethylene glycol.

Component B is a humectant or binder and includes any is water soluble and has a viscosity sufficient to provide to the ink the desired properties for the printer and substrate. Examples of suitable humectants and binders include ethylene glycol, propylene glycol, butanediol, glycerol, polyethylene glycols of the formula H—(OCH$_2$—CH$_2$)$_n$—OH having a $M_n$ of between about 200 and 10,000; poly (ethylene glycol) methyl ethers having an $M_n$ of about 250 to about 5,000; polyvinyl alcohols, polyvinylpyridines, and polyvinylpyrrolidones and mixtures thereof. Preferably said humectant is selected from ethylene glycol, propylene glycol, butanediol, glycerol, polyethylene glycols of the formula H—(OCH$_2$—CH$_2$)$_n$—OH wherein n is 2 to 6 and mixtures thereof.

The term lower aliphatic alcohol is used to include methanol, ethanol, n-propanol, isopropanol, ethylene glycol mono C$_1$-C$_2$ alkyl ethers and mixtures of these.

Various additives may also be added. Suitable additives include surfactants, surface active agents, defoaming agents, corrosion inhibitors and biocides.

Preferred surface active agents or surfactants are the nonionic types containing polyalkylene oxide moieties. A particularly preferred type of nonionic surfactant is obtained by ethoxylating acetylenic diols, such as ethoxylated tetramethyl decynediol (Surfynol 465, provided by Air Products and Chemicals, Inc., Allentown, Pa. 18195).

The activity of the surfactant may be controlled by addition of a defoaming agent or defoamer. A preferred defoamer is comprised of a mixture of tetramethyldecynediol and propylene glycol (Surfynol 104 PG, provided by Air Products and Chemicals, Inc., Allentown, Pa. 18195).

The term biocide is used to describe various antifungal compounds used to prevent or control the growth of various fungi upon prolonged standing of the ink compositions. A preferred biocide is 1,2-benzisothiazolin-3-one (Proxel®GXL, ICI Americas Inc., Wilmington, Del. 19897).

Corrosion inhibitors are added to the ink formulations to inhibit or reduce corrosion of the metal parts, particularly the nozzles/orifices, of the ink jet printers. A preferred class of corrosion inhibitors are the 1H-benzotriazoles and 1H-benzotriazole itself is the preferred corrosion inhibitor (Cobratec 99, PMC Specialties, Cincinatti, Ohio).

This invention provides aqueous ink formulations for ink jet printing of invisible, intelligible near infrared fluorescent markings which overcome the deficiencies of the prior inks. The inks of the present invention are especially useful for printing invisible markings such as bar codes on various porous or semiporous substrates, such as paper or paper products, where subsequent detection or identification are desired. The invisible markings may be on a white or colored background.

The inks and markings generated therefrom have the valuable property of being fluorescent when exposed to infrared radiation. The emitted light is detected by a near infrared radiation detector, thus allowing the invisible "marking" or "tagging" of items to which the film forming polymeric composition has been applied.

Based on the prior art, it is surprising that sulfopolyesters/ amides containing copolymerized near infrared fluorophores can be used to formulate suitable inks for ink jet printing which have good stability and which can be used for marking or tagging various substrates for identification/ authentication purposes. This result was particularly surprising because monomeric near infrared fluorophores formulated into solvent based inks lost much of the absorption at the desired wavelength because of apparent aggregation which shifts the wavelength of maximum absorption of the aggregated dye significantly to lower values. The aggregated dye has greatly reduced luminescence properties.

The following examples illustrate further the practice of the invention. The inherent viscosities specified herein are determined at 25° C., using 0.5 g of polymer per 100 mL of a solvent consisting of 60 weight percent phenol and 40 weight percent tetrachloroethane. The weight average molecular weight (Mw) and number average molecular weight (Mn) values referred to herein are determined by gel permeation chromatography (gpc).

Example 1

Components I–VII were added to a 500 mL round bottom flask which was fitted with a vacuum outlet, stirrer, condensate takeoff and nitrogen inlet.

I 81.77 g (0.421 m) dimethyl isophthalate

II 24.80 g (0.0837 m) dimethyl 5-sodiosulfoisophthalate

III 44.11 g (0.416 m) diethylene glycol

IV 34.07 g (0.236 m) 1,4-cyclohexanedimethanol

V 0.75 g (0.0088 m) anhydrous sodium acetate

VI 100 ppm Ti catalyst as titanium isopropoxide

VII 0.28 g (3.6×10$^{-4}$m) infrared fluorescent compound —NcSi(OH)$_2$ [Wheeler, et al., J.A.C.S. Vol. 106, No. 24, 1984, pp 7404–7410] (Nc=naphthalocyanine)

The flask and contents were immersed in a Belmont metal bath at 200° C. and stirred for 1.0 hour with a nitrogen sweep over the reaction mixture. The bath temperature was increased to 220° C. over about 5 minutes and held at 220° C. for 2.0 hours. To complete the polycondensation, the temperature of the reaction mixture was increased to about 250° C., vacuum was applied to lower the pressure to about 0.5 mmHg, and heating at 250° C. continued for about 20 minutes. The resulting polymer, which was ground using a Wiley mill to pass through a 2 mm screen, has an inherent viscosity (I.V.) of 0.275, a weight average (Mw) molecular weight of 14,867, a number average (Mn) molecular weight of 3,848, a polydispersity (Mw/Mn) of 3.86, a glass transition temperature (Tg) of 48.4° C. and contains about 0.2 weight percent (2000 ppm) of the near infrared fluorophore (NIRF).

Example 2

A portion (100 g) of the water-dissipatable sulfo-containing polyester of Example 1 was added portionwise to distilled water (250 mL) at about 95° C. with stirring. The mixture was stirred until dispersion of the polymer was completed and then cooled. Total weight of the aqueous dispersion which contained about 29% by weight of the water-dissipatable sulfo-containing polyester having about 2,000 ppm of NIRF reacted therein was 343 g.

Example 3

Near infrared fluorophore PcAl—OC$_6$H$_3$-3,5-diCO$_2$CH$_3$ (0.7 g, 9.36×10$^{-4}$m) (Example 29 of U.S. Pat. No. 5,397, 819) was combined with components I–VI of Example 1 above and reacted to produce the condensation polymer exactly as described in Example 1. The water-dissipatable sulfo-containing polyester thus produced contained about 0.5% by weight (5,000 ppm) of the NIRF compound copolymerized therein and was ground in a Wiley mill to pass through a 2 mm screen. The polymer has an I.V. of 0.293, a Tg of 52.6° C., a Mw of 16,244, a Mn of 4,510 and a polydispersity of 3.60.

Example 4

A portion (100 g) of the polymer of Example 3 was added portionwise to distilled water (250 mL) at 95°–100° C. with stirring. The mixture was stirred until dispersion was completed and then cooled. Total weight of the aqueous dispersion which contained about 30% by weight of the water-dissipatable sulfo-containing polyester having about 5,000 ppm of NIRF reacted therein was 337.5 g.

Example 5

Example 1 was repeated using 0.14 g ($1.8\times10^{-4}$ m) of the same infrared fluorescent compound —NcSi(OH)$_2$— to give a polymer which contained about 0.1 weight percent (1,000 ppm) of the near infrared fluorophore. The polymer has an I.V. of 0.268, a Tg of 49.2° C., a Mw of 15,092, a Mn of 6,582, and a polydispersity of 2.29.

Example 6

A portion (110 g) of the polymer of Example 5 was added portionwise to distilled water (275 mL) at 95°–100° C. with stirring. The mixture was stirred until dispersion was completed and then cooled. Total weight of the aqueous dispersion which contained about 30% by weight of the water-dissipatable sulfo-containing polyester having about 1,000 ppm of NIRF reacted therein was 365.5 g.

Example 7

Example 1 was repeated using 0.7 g ($9.0\times10^{-4}$ m) of the same infrared fluorescent compound —NcSi(OH)$_2$— to give a polymer which contained about 0.5 weight percent (5,000 ppm) of the near infrared fluorophore. The polymer has an I.V. of 0.288, a Tg of 51.0° C., a Mw of 16,372, a Mn of 4,643, and a polydispersity of 3.52.

Example 8

A portion (100 g) of the polymer of Example 7 was added portionwise to distilled water (250 mL) at 90°–95° C. with stirring. The mixture was stirred until dispersion was completed and then cooled. Total weight of the aqueous dispersion which contained about 30% by weight of the water-dissipatable sulfo-containing polyester having about 5,000 ppm of NIRF reacted therein was 334.6 g.

Example 9

Components I–VII were added to a 500 mL round bottom flask which was fitted with a vacuum outlet stirrer, condensate takeoff and nitrogen inlet.

I 116.78 g (0.602 m) dimethyl isophthalate

II 35.40 g (0.120 m) dimethyl 5-sodiosulfoisophthalate

III 63.07 g (0.595 m) diethylene glycol

IV 48.68 g (0.338 m) 1,4-cyclohexanedimethanol)

V 0.98 g (0.120 m) anhydrous sodium acetate

VI 75 ppm Ti catalyst as titanium isopropoxide

VII 0.40 g ($5.3\times10^{-4}$ m) infrared fluorescent compound —PcAl—OC$_6$H$_3$-3,5-di-CO$_2$CH$_3$ (Pc=phthalocyanine) [Compound of Example 29 of U.S. Pat. No. 5,397,819]

The flask and contents were immersed in a Belmont metal bath at 200° C. and stirred for 1.0 hour with a nitrogen sweep over the reaction mixture. The bath temperature was increased to 220° C. over about 5 minutes and held at 220° C. for 2.0 hours. The polycondensation was completed by increasing the bath temperature to 250°, applying vacuum and reducing the pressure to about 0.1 mmHg and heating for about 15 minutes. The resulting polymer, which was ground using a wiley mill to pass through a 2 mm screen, has an I.V. of 0.271, a weight average (Mw) molecular weight of 14,458, a number average (Mn) molecular weight of 7,162, a polydispersity of 2.0, a glass transition temperature (Tg) of 48.8° C., and contains about 0.2 weight percent (2,000 ppm) of the near infrared fluorophore.

Example 10

A portion (150 g) of the water-dissipatable sulfo-containing polyester of Example 9 was added to distilled water (375 mL) or about 95°–100° C. with stirring until dispersion of the polymer was completed and then the mixture was cooled. The total weight of the aqueous dispersion which contained about 29% by weight of the water-dissipatable sulfo-containing polyester having about 2,000 ppm of NIRF reacted therein was 514.7 g.

Example 11

A mixture of 2(3), 11(12), 20(21), 29(30)-tetra-t-butylNcAlCl (5.0 g, 0.005 m) (Product of Example 34 of U.S. Pat. No. 5,397,819), dimethyl 5-hydroxyisophthalate (1.05 g, 0.005 m) (Aldrich) and pyridine (200 mL) was heated and stirred at reflux for a total of 55 hours. After cooling the reaction mixture was drowned into water (500 mL). The product, 2(3), 11(12), 20(21), 29(30)-tetra-t-butyl-NcAl-OC$_6$H$_3$-3,5-diCO$_2$CH$_3$, was collected by filtration, washed with water and air dried (yield—4.9 g).

Example 12

Components I–VI of Example 9 were combined with the near infrared fluorophore of Example 11 above (0.4 g, $3.4\times10^{-4}$ m) and the polymerization reaction carried out exactly as described as in Example 9. The water-dissipatable sulfo-polyester thus prepared contains about 2,000 ppm of the NIRF compound and has an I.V. of 0.27, a Tg of 49.9° C., a weight average molecular weight (Mw) of 13,986, a number average molecular weight (Mn) of 4,088 and a polydispersity of 3.42.

Example 13

A portion (150 g) of the polymer of Example 12 was added portionwise with stirring to distilled water (375 mL) at 95°–100° C. Stirring was continued until dispersion of polymer was completed and then the mixture was allowed to cool. Total weight of the aqueous dispersion which contained about 29.6% by weight of polymer was 507.5 g.

Example 14

Components I–VI of Example 9 above were combined with the near infrared fluorophore 2(3), 9(10), 16(17), 23(24)-tetraphenoxy-Pc-Si(OC$_6$H$_4$-4-CO$_2$CH$_3$)$_2$ (0.4 g, $3.3\times10^{-4}$ m) (Example 24 of U.S. Pat. No. 5,397,819) and the polymerization reaction carried out exactly as described in Example 9. The water-dissipatable sulfo-polyester thus prepared contains about 0.2% by weight (2,000 ppm) of the NIRF compound and has an I.V. of 0.24, a Tg of 49.5° C., a weight average molecular weight (Mw) of 13,591, a number average molecular weight (Mn) of 4,391 and a polydispersity of 3.1.

Example 15

A portion (150 g) of the polymer of Example 14 was added portionwise with stirring to distilled water (375 mL)

at 95°–100° C. Stirring was continued until dispersion of polymer was completed and then the mixture was cooled. Total weight of the aqueous dispersion which contained about 29.7% by weight of the polymer was 505 g.

Example 16

One hundred and fifty grams of water-dissipatable sulfo-containing polyester, which contained about 5,000 ppm of near infrared fluorophore NcSi(OH)$_2$ reacted therein, were prepared exactly as described in Example 7 above and added portionwise to distilled water (375 mL) at 95°–100° C. with stirring. The mixture was stirred until dispersion of the polymer was completed and then allowed to cool. Total weight of the aqueous dispersion which contained about 30% by weight of the polymer was 512.8 g.

Example 17

Preparation of 780 nm NIRF Ink for Continuous Ink Jet Printing

Components I–VII were combined to produce a NIRF ink containing about 120 ppm of the near infrared fluorophore by mixing in a Cowles dissolver for about 25 minutes using moderate shear.

| Component | Parts |
| --- | --- |
| I | 8.00 parts aqueous solution from Example 16 which contained 29.0% by weight of sulfopolyester containing 5,000 ppm NcSi(OH)$_2$ residue |
| II | 6.80 parts propylene glycol |
| III | 84.30 parts deionized water |
| IV | 0.50 parts Surfynol 465 surfactant (an ethoxylated tetramethyl decynediol surfactant (Air Products and Chemicals, Inc.) |
| V | 0.25 parts Surfynol 104 PG defoaming agent (a mixture of tetramethyl decynediol and propylene glycol (Air Products and Chemicals, Inc.) |
| VI | 0.10 parts Proxel® GXL (30 wt % in water) biocide (ICI Americas, Inc.) |
| VII | 0.05 parts corrosion inhibitor [50% by weight solution of 1H-benzotriazole (PMC Specialties) in propylene glycol] |
|  | 100.00 parts |

The composition thus produced was vacuum filtered in series through a depth filter (extra thick glass fiber filter), Versapor 3000 (3 µ), Versapor 1200 (1.2 µ), and Versapor 800 (0.8 µ) from Gelman Sciences. The ink thus produced had a viscosity of 1.0 centipoise, a pH of 6.72, a conductivity of 437 micro mhos, an average particle size of 0.018 micron (µ), a surface tension of 30.53 dynes/cm. Using the Scitex 5100 ink jet printer (Scitex Digital Printing, Inc., Dayton, Ohio 45420-4099), invisible code 39 barcodes were printed on plain white paper at high speed.

Example 18

Lower Viscosity Ink

An ink having a surface tension of 27.88 dynes/cm and a conductivity of 517 micro mhos was prepared exactly as described in Example 17 except using 6.00 parts Component II, 84.35 parts Component III, 1.00 part Component IV and 0.50 part Component V and was used successfully to print invisible bar codes as described in Example 17.

Example 19

Preparation of 680 nm NIRF Ink for Ink Jet Continuous Printing

Components I–VII were combined to produce a NIRF ink containing about 120 ppm of the near infrared fluorophore by mixing in a Cowles dissolver/blender for about 22 minutes using moderate shear and then filtered as described in Example 17.

| Component | Parts |
| --- | --- |
| I | 20.0 parts aqueous solution from Example 10 which contained 29.0% by weight of sulfopolymer containing 2,000 ppm PcAlOC$_6$H$_3$-3,5-diCO$_2$CH$_3$ residue |
| II | 6.00 parts propylene glycol |
| III | 73.10 parts deionized water |
| IV | 0.50 partS Surfynol 465 |
| V | 0.25 partS Surfynol 104 PG |
| VI | 0.10 parts Proxel® GXL (30% in water) |
| VII | 0.05 parts corrosion inhibitor [50% by weight solution of 1H-benzotriazole in propylene glycol] |
|  | 100.00 parts |

The ink thus prepared had a viscosity of 1.01 cps, a surface tension of 32.97 dynes/cm, a conductivity of 513 micro mhos, an average particle size of 0.015 µ, a pH of 6.90 and an absorption maximum ($\lambda$max) at 679 nm in the visible/near infrared light absorption spectrum as determined using an ACS Sensor II Spectrophotometer (Applied Color Systems). Bar codes were successfully printed on plain white paper as described in Example 17.

Example 20

An ink similar to that of Example 19, but having a surface tension of 27.68 dynes/cm and a conductivity of 502 micro mhos was prepared as in Example 19 except using 8.00 parts of aqueous solution from Example 4 which contained 30% of sulfopolyester containing 5,000 ppm PcAlOC$_6$H$_3$-3,5-diCO$_2$CH$_3$ for Component I, 84.35 parts Component III, 1.00 part Component IV, and 0.50 part Component V. Successful printing of bar codes on plain white paper was carried out as in Example 17.

Example 21

An ink was prepared exactly as described in Example 19 except 20.00 parts of aqueous solution from Example 13, which contained 29.6% by weight of sulfopolyester containing 2,000 ppm of NIRF compound [2(3), 11(12), 20(21), 20(21), 29(30)-tetra-t-butyl-NcAl-OC$_6$H$_3$-3,5-diCO$_2$CH$_3$] was used for Component I.

Example 22

An ink was prepared exactly as described in Example 19 except 20.0 parts of aqueous solution from Example 15, which contained 29.7% by weight of sulfopolyester contining 2,000 ppm of NIRF compound [2(3), 9(10), 16(17), 23(24)-tetraphenoxy-PcSi (OC$_6$H$_4$-4-CO$_2$CH$_3$)$_2$] was used for Component I.

Example 23

Preparation of 780 nm NIRF Ink for Single Nozzle Continuous Ink Jet Printing

Components I–VI were combined to produce a NIRF ink containing about 120 ppm of the near infrared fluorophore by mixing in a Cowles dissolver/blender for about 25 minutes using moderate shear and then vacuum filtered in series through a depth filter (extra thick glass fiber filter), Versapor 3000 (3 µ), Versapor 1200 (1.2 µ) from Gelman Sciences).

| Component | Parts |
|---|---|
| I | 8.00 parts aqueous solution from Example 16 which contained 29.0% by weight of sulfopolyester containing 5,000 ppm NcSi(OH)$_2$ residue |
| II | 41.00 parts propylene glycol |
| III | 41.90 parts deionized water |
| IV | 9.00 parts n-propyl alcohol |
| V | 0.05 part Proxel ® GXL (30% in water) biocide |
| VI | 0.05 parts corrosion inhibitor (50% solution of 1H-benzotriazole in propylene glycol) |
| | 100.00 parts |

The ink thus produced had a viscosity of 5.0 cps, a surface tension of 34.5 dynes/cm a conductivity of 123 micro mhos and was used successfully to print on plain white paper using a Domino Codebox 2 Printer (Domino Amjet, Inc., Gurnee, Ill. 60031) to provide invisible markings.

Example 24

Preparation of Drop-On-Demand Bubble Jet Ink (670 nm)

Components I–VI were mixed using a Cowles dissolver/blender for about 25 minutes with moderate shear to provide a NIRF ink containing about 120 ppm of the near infrared fluorophore.

| Component | Parts |
|---|---|
| I | 8.00 parts aqueous solution from Example 4 which contained 30.0% by weight of sulfopolyester containing 5,000 ppm PcAl—O C$_6$H$_3$-3,5-diCO$_2$CH$_3$ residue |
| II | 45.00 parts propylene glycol |
| III | 45.85 parts deionized water |
| IV | 1.00 part Surfynol 465 |
| V | 0.10 parts Proxel ® GXL (30% in water) |
| VI | 0.05 parts corrosion inhibitor (50% solution of 1H-benzotriazole in propylene glycol) |
| | 100.00 parts |

The ink composition thus prepared had a viscosity of 5.0 cps and was successfully used to print bar codes (Code 39) on plain white paper using a drop-on-demand, bubble jet printer Kodak Diconix 180Si Printer (Eastman Kodak Company, Rochester, N.Y. 4650) to produce invisible markings.

Example 25

Preparation of Drop-On-Demand Bubble Jet Ink (780 nm)

An ink was prepared and used for printing invisible bar codes exactly as described in Example 24, except Component I was 8.00 parts of aqueous solution from Example 8 which contained 30.0% by weight of sulfopolyester containing 5,000 NcSi(OH)$_2$. The ink had a viscosity of 4.5 cps.

Example 26

Preparation of Drop-On-Demand Piezoelectric Impulse Jet Ink

Components I–V were combined to produce a NIRF ink containing about 180 ppm of the near infrared fluorophore by mixing at medium shear for 10 minutes and then filtering by gravity.

| Component | Parts |
|---|---|
| I | 30.0 parts aqueous solution from Example 2 which contained 29.0% by weight of sulfopolyester containing 2,000 ppm NcSi(OH)$_2$ residue |
| II | 65.00 parts propylene glycol |
| III | 4.85 parts n-propanol |
| IV | 0.10 parts Proxel ® GXL (30% in water) |
| V | 0.05 parts corrosion inhibitor (50% solution of 1H-benzotriazole in propylene glycol) |
| | 100.00 parts |

The ink thus produced had a viscosity of 19.5 cps, a surface tension of 36.63 dynes/cm and was useful for jet printing invisible markings using the drop-on-demand piezoelectric impulse method.

Example 27

Preparation of Drop-On-Demand Piezoelectric Impulse Jet Ink

Components I–VII were combined to produce a NIRF ink containing about 180 ppm of the near infrared fluorophore by mixing at medium shear for 10 minutes and then filtering by gravity.

| Component | Parts |
|---|---|
| I | 30.0 parts aqueous solution from Example 2 which contained 29.0% by weight of sulfopolyester containing 2,000 ppm NiSi(OH)$_2$ residue |
| II | 50.00 parts propylene glycol |
| III | 10.00 parts glycerine |
| IV | 4.85 parts deionized water |
| V | 5.00 parts n-propanol |
| VI | 0.10 parts Proxel ® GXL (30 wt % in water) |
| VII | 0.05 parts corrosion inhibitor [50% solution of 1H-benzotriazole in propylene glycol] |
| | 100.00 parts |

The ink thus produced had a viscosity of 18.0 cps, a surface tension of 37.04 dynes/cm and was useful for printing invisible marking using the drop-on-demand piezoelectric impulse ink jet method.

The viscosities reported in above examples were measured in centipose(s) units, cp (cps) using a Shell Cup #2 Viscometer (Morcross Corporation, 255 Newtonville Ave., Newton, Mass. 02158). The surface tension values were measured in dynes/cm using a Surface Force Analyzer SFA-211 (Cahn Instrument, Inc., 16207 South Carmenita Rd., Cerritus, Calif. 90701). The average particle sizes were measured in microns (µ) using a Microtrac-Ultrafine Particle Analyzer Model 9230-1-00-1 (Leads and Northrup Co. Sunneytown Pike, North Wales, Pa. 19454 and the conductance was measured in micro mhos using a YSI Model 32 Conductance Meter (Yellow Springs Instrument Co., Inc., Scientific Division, Yellow Springs, Ohio 45387).

Examples 28-9 and Comparative Examples

The ink compositions listed in Table 2 below were made via the procedure of Example 24 having 2%, 10% and 20% by weight NIRF containing polymer.

TABLE 2

| Component | % Polymer | | | |
|---|---|---|---|---|
| Example # | 28 | 29 | Comp 1 | Comp 2 |
| propylene glycol | 42.60 | 32.50 | 15.00 | 1.50 |
| NIRF | 6.70 | 33.40 | 50.00 | 66.70 |
| Surfynol 465 | 1.00 | 1.00 | 1.00 | 1.00 |
| DI water | 49.55 | 32.95 | 33.85 | 30.65 |
| Corrosion Inhibitor (50%) | 0.05 | 0.05 | 0.05 | 0.05 |
| Proxel GX1 (30%) | 0.10 | 0.10 | 0.1 | 0.10 |
| Total | 100.00 | 100.00 | 100.00 | 100.00 |
| Viscosity (#2 shell cup in seconds) | 14.5 | 15.5 | 15.0 | 15.0 |
| Viscosity (cps) | 4.7 | 5.5 | 5.0 | 5.0 |

Eight Kodak Diconix 180 Si printheads were filled with the inks listed in Table 1 (two printheads were charged with each ink). Each print head was put into the Kodak Diconix 180 Si printer at the time intervals specified in Table 3, below. Printing was conducted at 68° F. and 65% relative humidity. The print heads were stored at 68° F. and 65% relative humidity when not in use. If the printhead did not print the printhead was primed by pushing the ink bladder until ink passed through the jets. The printhead was then wiped clean with a lint free cloth and start up was attempted again. The results are shown in Table 3, below.

TABLE 3

| Ex # | % Polymer in Ink | 1st hr | 3 days | 10 days | 20 days | 34 days |
|---|---|---|---|---|---|---|
| 28 | 2% | 4 | 4 | 4 | 4 | 4 |
| 28 | 2% | 4 | 4 | 4 | 4 | 4 |
| 29 | 10% | 4 | 4 | 4 | 4 | 4 |
| 29 | 10% | 4 | 4 | 4 | 4 | 4 |
| Comp 1 | 15% | 4 | 2 | 1 | 1 | 1 |
| Comp 1 | 15% | 4 | 2 | 1 | 1 | 1 |
| Comp 2 | 20% | 0 | 0 | 0 | 0 | 0 |
| Comp 2 | 20% | 0 | 0 | 0 | 0 | 0 |

0 - Very poor; clogged orifices; no jets printing
1 - poor; clogged orifice; won't print even with multiple priming (>3); >1 jet not printing
2 - fair; all jets print after priming 3X
3 - good; all jets print after 1–2 priming
4 - excellent; no priming necessary Inks having compositions similar to those disclosed in U.S. Pat. No. 5,336,714 were not printable at any time interval. The ink jet orifices were clogged and could not be corrected by priming. However, surprisingly the inks of the present invention displayed excellent printability over the entire test period. Even though the inks of the present invention contain greatly reduced amounts of the NIRF (between about 1/100 to 1/2 as compared to U.S. Pat. No. 5,336,714) the inks still produce a detectible fluorescent signal.

We claim:

1. A method for invisibly marking, for identification purposes, an article with a water-dispersible polymer, wherein said polymer has from about 0.1 to about 10.0 ppm of a residue of a near infrared flourescing compound copolymerized therein, which comprises applying to said article a composition comprising A. between about 1 and 10 weight percent of at least one water-dissipatable polyester comprising:

(i) monomer residues of at least one dicarboxylic acid;
(ii) about 4 to 25 mole percent, based on the total of all acid, hydroxy and amino equivalents, of monomer residues of at least one difunctional sulfomonomer containing at least one sulfonate group bonded to an aromatic ring where the functional groups are selected from the group consisting of hydroxy, carboxyl, carboxylate ester and amino;
(iii) monomer residues of at least one diol or a mixture of diol and a diamine; and optionally,
(iv) monomer residues of at least one difunctional monomer reactant selected from the group consisting of hydroxycarboxylic acids, amino carboxylic acids and aminoalkanols;

provided that at least 20 percent of the groups linking the monomeric units are ester linkages; said water-dissipatable polyester having from about 0.1 ppm by weight to about 10% by weight of a thermally stable near infrared fluorophoric compound copolymerized therein;

B. between about 5 and 75 weight percent of at least one humectant;

C. between about 0 and 15 weight percent of at least one lower aliphatic alcohol of no more than 3 carbon atoms;

D. water and optionally up to about 2 weight percent of one or more additives; wherein the weight percentages of components A–D equal 100%.

2. The method of claim 1 wherein said water-dissipatable polyester is a sulfopolyester and wherein the diol of component (iii), based upon 100 mole % diol comprises (a) at least 15 mole percent of a diol having the formula $H(OCH_2CH_2)_nOH$, where n is 2 to about 20, or (b) about 0.1 to less than about 15 mole percent of a poly(ethylene glycol) having the formula $H(OCH_2CH_2)_nOH$, where n is 2 to about 500, provided that the mole percent of said poly(ethylene glycol) is inversely proportional to the value of n.

3. The method of claim 1 comprising:

A. said water dissipatible polyester;

B. between about 45 and 75 weight percent of said humectant;

C. between about 2 and about 15 weight percent of said lower aliphatic alcohol;

D. water; between about 0.01 and about 0.50 weight percent of at least one corrosion inhibitor; and between about 0.01 and about 0.30 weight percent of at least one biocide.

4. The method of claim 1 further comprising

A. said water-dissipatable polyester;

B. between about 20 and about 60 weight percent of said humectant;

C. between about 0.50 and about 1.5 weight percent of at least one surface active agent;

D. water; between about 0.01 and about 0.5 weight percent of at least one corrosion inhibitor;

between about 0.01 and about 0.3 weight percent of at least one biocide.

5. The method composition of claim 1 comprising

A. said water-dissipatable polyester;

B. between about 4 and about 8 weight percent of said humectant;

C. between about 0.35 and about 0.65 weight percent of at least one surface active agents;

D. water; between about 0.75 and about 1.25 weight percent of at least one defoaming agent; between about 0.01 and about 0.50 weight percent of at least one corrosion inhibitor; between about 0.01 and about 0.3 weight percent of at least one biocide.

6. The method of claim 1 comprising
   A. said water-dissipatable polyester;
   B. between about 30 and about 50 weight percent of said at least one humectant;
   C. between about 5 and about 15 weight percent of said at least one alcohol;
   D. water; between about 0.01 and about 0.50 weight percent of at least one corrosion inhibitor;
   between about 0.01 and about 0.30 weight percent of at least one biocide.

7. The method of claim 1, wherein the near infrared flourescing compound is selected from the group consisting of phthalocyanines, 2,3-naphthalocyanines and squaraines and correspond to Formulae II, III and IV:

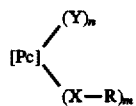
(II)

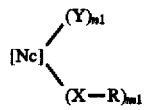
(III)

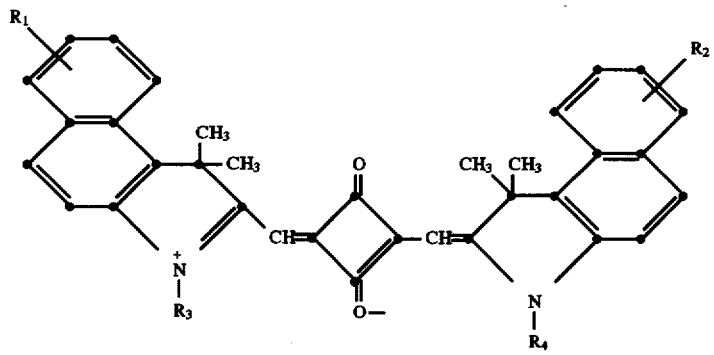
IV wherein Pc and Nc represent the phthalocyanine and 2,3-naphthalocyanine moieties of Formulae IIa and IIIa,

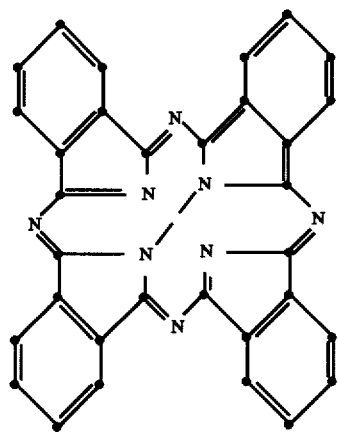
IIa

-continued

IIIa

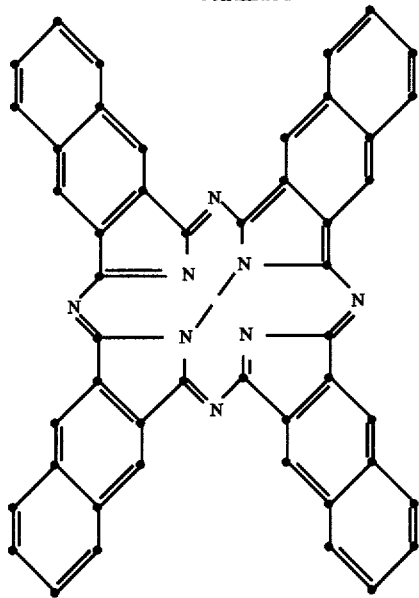

respectively, covalently bonded to a moiety selected from the group consisting of hydrogen, and metals, halometals, organometallic groups, and oxymetals selected from a group consisting of AlCl, AlBr, AlF, AlOH, AlOR$_5$, AlSR$_5$, Ca, CrF, Fe, Ge, GaCl, GaBr, GaF, GaOR$_5$, GaSr$_5$, InCl, Mg, Mn, SiCl$_2$, SiF$_2$, SnCl$_2$, Sn(OR$_6$)$_2$, Si(OR$_6$)$_2$, Sn(SR$_6$)$_2$, Si(SR$_6$)$_2$, Sn and Zn, wherein R$_5$ and R$_6$ are selected from the group consisting of hydrogen, alkyl, aryl, aroyl, heteroaryl, lower alkanoyl, trifluoroacetyl and groups of the formulae

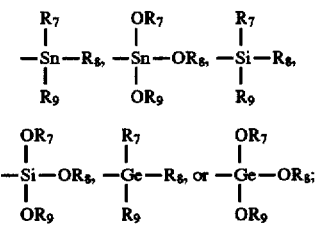

R$_7$, R$_8$ and R$_9$ are independently selected from the group consisting of alkyl, phenyl or phenyl substituted with lower alkyl, lower alkoxy or halogen;

X is selected from the group consisting of oxygen, sulfur, selenium, tellurium and a group of the formula —N—R$_{10}$, wherein R$_{10}$ is hydrogen, cycloalkyl, alkyl, acyl alkyl-sulfonyl, or aryl or R$_{10}$ and R taken together form an aliphatic or aromatic ring with the nitrogen atom to which they are attached;

Y is selected from the group consisting of alkyl, aryl, halogen or hydrogen;

R is selected from the group consisting of unsubstituted or substituted alkyl, alkenyl, alkynyl, C$_3$–C$_8$ cycloalkyl, aryl, heteroaryl,

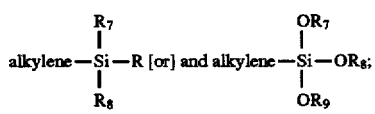

or

—(X—R)$_m$ is selected from the group consisting of alkylsulfonylamino, arylsulfonylamino, or a group selected from the formulae —X(C$_2$H$_4$O)$_z$R$^1$,

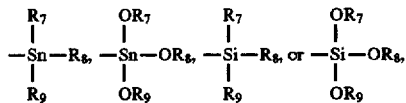

wherein R$^1$ is hydrogen or R as defined above; Z is an integer of from 1–4;

or two —(X—R)$_m$ groups can be taken together to form divalent substituents of the formula

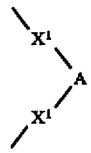

wherein each X$^1$ is independently selected from the group consisting of —O—, —S—, or —N—R$_{10}$ and A is selected from the group consisting of ethylene; propylene; trimethylene; and said groups constituted with C$_1$–C$_4$ alkyl, C$_1$–C$_4$ alkoxy, aryl and cycloalkyl; 1,2-phenylene and 1,2-phenylene containing 1–3 substituents selected from the group consisting of C$_1$–C$_4$ alkyl, C$_1$–C$_4$ alkoxy and halogen;

R$_1$ and R$_2$ are independently selected from the group consisting of hydrogen, lower alkyl, lower alkoxy, halogen, aryloxy, lower alkylthio, arylthio, lower alkylsulfonyl; arylsulfonyl; lower alkylsulfonylamino, arylsulfonylamino, cycloalkylsulfonylamino, carboxy, unsubstituted and substituted carbamoyl and sulfamoyl, lower alkoxycarbonyl, hydroxy, lower alkanoyloxy,

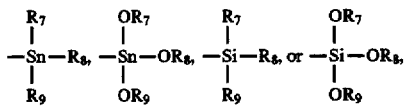

R$_3$ and R$_4$ are independently selected from the group consisting of hydrogen, lower alkyl, alkenyl or aryl; n is an integer from 0–12; n$_1$ is an integer from 0–24, m is an integer from 4–16; m$_1$ is an integer from 0–16; provided that the sums of n+m and n$_1$+m$_1$ are 16 and 24, respectively, provided that at least one polyester reactive group is present.

8. The method of claim 7, wherein the near infrared fluorescing compound is a squaraine compound of Formula IV, wherein R$_1$ and R$_2$ are independently carboxy or lower alkoxycarbonyl.

9. The method of claim 7, wherein the near infrared fluorescing compound is a 2,3-naphthalocyanine compound of Formula III, wherein Y is hydrogen, n$_1$ is 24, and m$_1$ is 0.

10. The method of claim 7, wherein the near infrared fluorescing compound is a 2,3-naphthalocyanine compound of Formula III, wherein the naphthalocyanine moiety is bonded to SiCl$_2$, Si(OH)$_2$, or Si(OR$_6$)$_2$.

11. The method of claim 7, wherein the near infrared fluorescing compound is a phthalocyanine compound of Formula II, wherein X is oxygen, R is aryl, Y is hydrogen, m is 4, and n is 12; and wherein the phthalocyanine moiety is bonded to a moiety selected from the group consisting of AlCl, AlOH, AlOCOCF$_3$, AlOR$_5$, SiCl$_2$, Si(OH)$_2$, and Si(OR$_6$)$_2$.

12. The method of claim 7 wherein said near infrared fluorescing compound is covalently bonded to a moiety selected from the group consisting of hydrogen, and metals, halometals, organometallic groups, and oxymetals selected from a group consisting of AlCl, AlBr, AlF, AlOH, AlOR$_5$, AlSR$_5$, GaCl, GaBr, GaF, GaOR$_5$, GaSr$_5$, Mg, SiCl$_2$, SiF$_2$, SnCl$_2$, Sn(OR$_6$)$_2$, Si(OR$_6$)$_2$, Sn(SR$_6$)$_2$, Si(SR$_6$)$_2$, Sn and Zn.

13. A method for detecting an invisible mark on an article comprising the steps of exposing said marked article to infrared radiation sufficient to cause said mark to fluoresce and detecting said fluorescence, wherein said mark is formed from an ink comprising A. between about 1 and 10 weight percent of at least one water-dissipatable polyester comprising:
     (i) monomer residues of at least one dicarboxylic acid;
     (ii) about 4 to 25 mole percent, based on the total of all acid, hydroxy and amino equivalents, of monomer residues of at least one difunctional sulfomonomer containing at least one sulfonate group bonded to an aromatic ring where the functional groups are selected from the group consisting of hydroxy, carboxyl, carboxylate ester and amino;
     (iii) monomer residues of at least one diol or a mixture of diol and a diamine; and optionally,
     (iv) monomer residues of at least one difunctional monomer reactant selected from the group consisting of hydroxycarboxylic acids, amino carboxylic acids and aminoalkanols;
provided that at least 20 percent of the groups linking the monomeric units are ester linkages; said water-dissipatable polyester having from about 0.1 ppm by weight to about 10% by weight of a thermally stable near infrared fluorophoric compound copolymerized therein;

B. between about 5 and 75 weight percent of at least one humectant;

C. between about 0 and 15 weight percent of at least one lower aliphatic alcohol of no more than 3 carbon atoms;

D. water and optionally up to about 2 weight percent of one or more additives; wherein the weight percentages of components A–D equal 100%.

14. The method of claim 13 wherein said water-dissipatable polyester is a sulfopolyester and wherein the diol of component (iii), based upon 100 mole % diol comprises (a) at least 15 mole percent of a diol having the formula H(OCH$_2$CH$_2$)$_n$OH, where n is 2 to about 20, or (b) about 0.1 to less than about 15 mole percent of a poly(ethylene glycol) having the formula H(OCH$_2$CH$_2$)$_n$OH, where n is 2 to about 500, provided that the mole percent of said poly(ethylene glycol) is inversely proportional to the value of n.

15. The method of claim 13 wherein said water-dissipatable polyester is a sulfopolyester and wherein the diol of component (iii), based upon 100 mole % diol comprises (a) at least 15 mole percent of a diol having the formula H(OCH$_2$CH$_2$)$_n$OH, where n is 2 to about 20, or (b) about 0.1 to less than about 15 mole percent of a poly(ethylene glycol) having the formula H(OCH$_2$CH$_2$)$_n$OH, where n is 2 to about 500, provided that the mole percent of said poly(ethylene glycol) is inversely proportional to the value of n.

16. The method of claim 13, wherein the near infrared flourescing compound is selected from the group consisting of phthalocyanines, 2,3-naphthalocyanines and squaraines and correspond to Formulae II, III and IV:

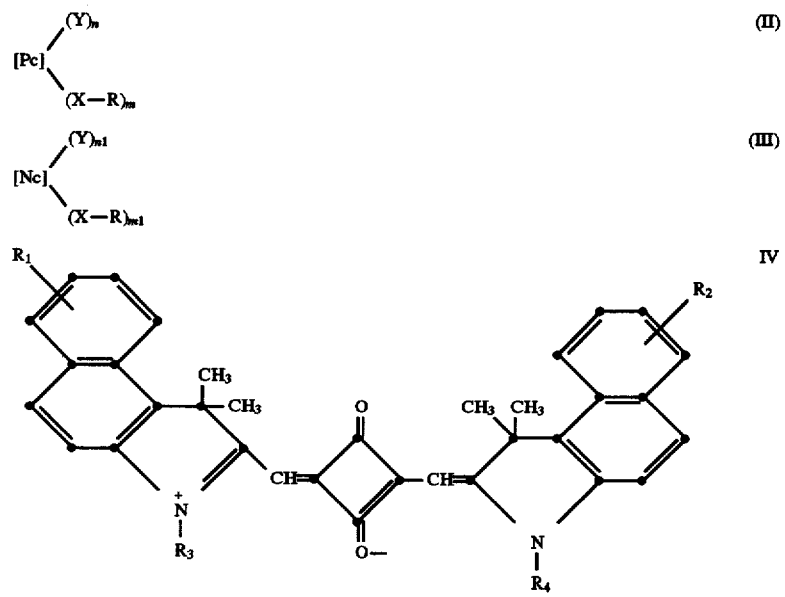

wherein Pc and Nc represent the phthalocyanine and 2,3-naphthalocyanine moieties of Formulae IIa and IIIa, IIa IIIa

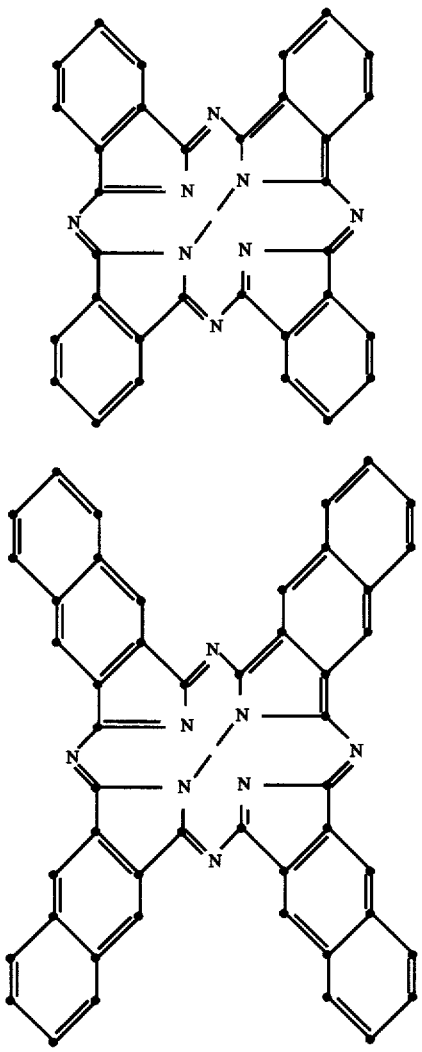

respectively, covalently bonded to a moeity selected from the group consisting of hydrogen, and metals, halometals, organometallic groups, and oxymetals selected from a group consisting of AlCl, AlBr, AlF, AlOH, AlOR$_5$, AlSR$_5$, Ca, CrF, Fe, Ge, GaCl, GaBr, GaF, GaOR$_5$, GaSr$_5$, InCl, Mg, Mn, SiCl$_2$, SiF$_2$, SnCl$_2$, Sn(OR$_6$)$_2$, Si(OR$_6$)$_2$, Sn(SR$_6$)$_2$, Si(SR$_6$)$_2$, Sn and Zn, wherein R$_5$ and R$_6$ are selected from the group consisting of hydrogen, alkyl, aryl, aroyl, heteroaryl, lower alkanoyl, trifluoroacetyl and groups of the formulae

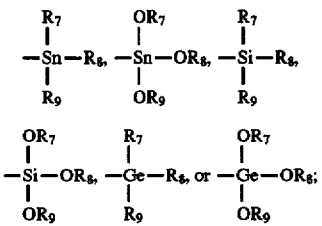

R$_7$, R$_8$ and R$_9$ are independently selected from the group consisting of alkyl, phenyl or phenyl substituted with lower alkyl, lower alkoxy or halogen;

X is selected from the group consisting of oxygen, sulfur, selenium, tellurium and a group of the formula —N—R$_{10}$, wherein R$_{10}$ is hydrogen, cycloalkyl alkyl acyl, alkylsulfonyl, or aryl or R$_{10}$ and R taken together form an aliphatic or aromatic ring with the nitrogen atom to which they are attached;

Y is selected from the group consisting of alkyl, aryl, halogen or hydrogen;

R is selected from the group consisting of unsubstituted or substituted alkyl, alkenyl, alkynyl, C$_3$–C$_8$ cycloalkyl, aryl, heteroaryl,

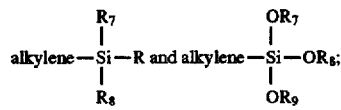

or

—(X—R)$_m$ is selected from the group consisting of alkylsulfonylamino, arylsulfonylamino, or a group selected from the formulae —X(C$_2$H$_4$O)$_z$R$^1$,

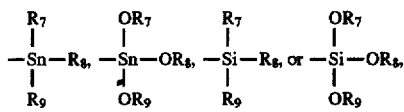

wherein R$^1$ is hydrogen or R as defined above; Z is an integer of from 1–4;

or two —(X—R)$_m$ groups can be taken together to form divalent substituents of the formula

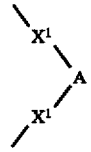

wherein each X$^1$ is independently selected from the group consisting of —O—, —S—, or —N—R$_{10}$ and A is selected from the group consisting of ethylene; propylene; trimethylene; and said groups substituted with C$_1$–C$_4$ alkyl, C$_1$–C$_4$ alkoxy, aryl and cycloalkyl; 1,2-phenylene and 1,2-phenylene containing 1–3 substituents selected from the group consisting of C$_1$–C$_4$ alkyl, C$_1$–C$_4$ alkoxy and halogen;

R$_1$ and R$_2$ are independently selected from the group consisting of hydrogen, lower alkyl, lower alkoxy, halogen, aryloxy, lower alkylthio, arylthio, lower alkylsulfonyl; arylsulfonyl; lower alkylsulfonylamino, arylsulfonylamino, cycloalkylsulfonylamino, carboxy, unsubstituted and substituted carbamoyl and sulfamoyl, lower alkoxycarbonyl, hydroxy, lower alkanoyloxy,

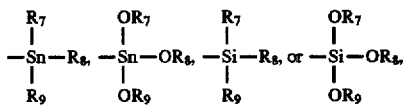

R$_3$ and R$_4$ are independently selected from the group consisting of hydrogen, lower alkyl, alkenyl or aryl; n is an integer from 0–12; n$_1$ is an integer from 0–24, m is an integer from 4–16; m$_1$ is an integer from 0–16;

provided that the sums of n+m and $n_1+m_1$ are 16 and 24, respectively, provided that at least one polyester reactive group is present.

17. The method of claim 13, wherein the near infrared fluorescing compound is a squaraine compound of Formula IV, wherein $R_1$ and $R_2$ are independently carboxy or lower alkoxycarbonyl.

18. The method of claim 13, wherein the near infrared fluorescing compound is a 2,3-naphthalocyanine compound of Formula III, wherein Y is hydrogen, $n_1$ is 24, and $m_1$ is 0.

19. The method of claim 13, wherein the near infrared fluorescing compound is a 2,3-naphthalocyanine compound of Formula III, wherein the naphthalocyanine moiety is bonded to $SiCl_2$, $Si(OH)_2$, or $Si(OR_6)_2$.

20. The method of claim 13, wherein the near infrared fluorescing compound is a phthalocyanine compound of Formula II, wherein X is oxygen, R is aryl, Y is hydrogen, m is 4, and n is 12; and wherein the phthalocyanine moiety is bonded to AlCl, AlOH, $AlOCOCF_3$, $AlOR_5$, $SiCl_2$, $Si(OH)_2$, or $Si(OR_6)_2$.

21. The method of claim 13 wherein said near infrared fluorescing compound is covalently bonded to hydrogen or to various metals, halometals, organometallic groups, and oxymetals selected from a group consisting of AlCl, AlBr, AlF, AlOH, $AlOR_5$, $AlSR_5$, GaCl, GaBr, GaF, $GaOR_5$, $GaSr_5$, Mg, $SiCl_2$, $SiF_2$, $SnCl_2$, $Sn(OR_6)_2$, $Si(OR_6)_2$, $Sn(SR_6)_2$, $Si(SR_6)_2$, Sn and Zn.

* * * * *